3,349,913
AUTOMATIC DEVICE FOR CONTROLLING
FEED OF AIDS TO FILTRATION
John R. Schneider, P.O. Box 426,
Belvedere, Calif. 94920
Filed Feb. 21, 1966, Ser. No. 528,720
4 Claims. (Cl. 210—85)

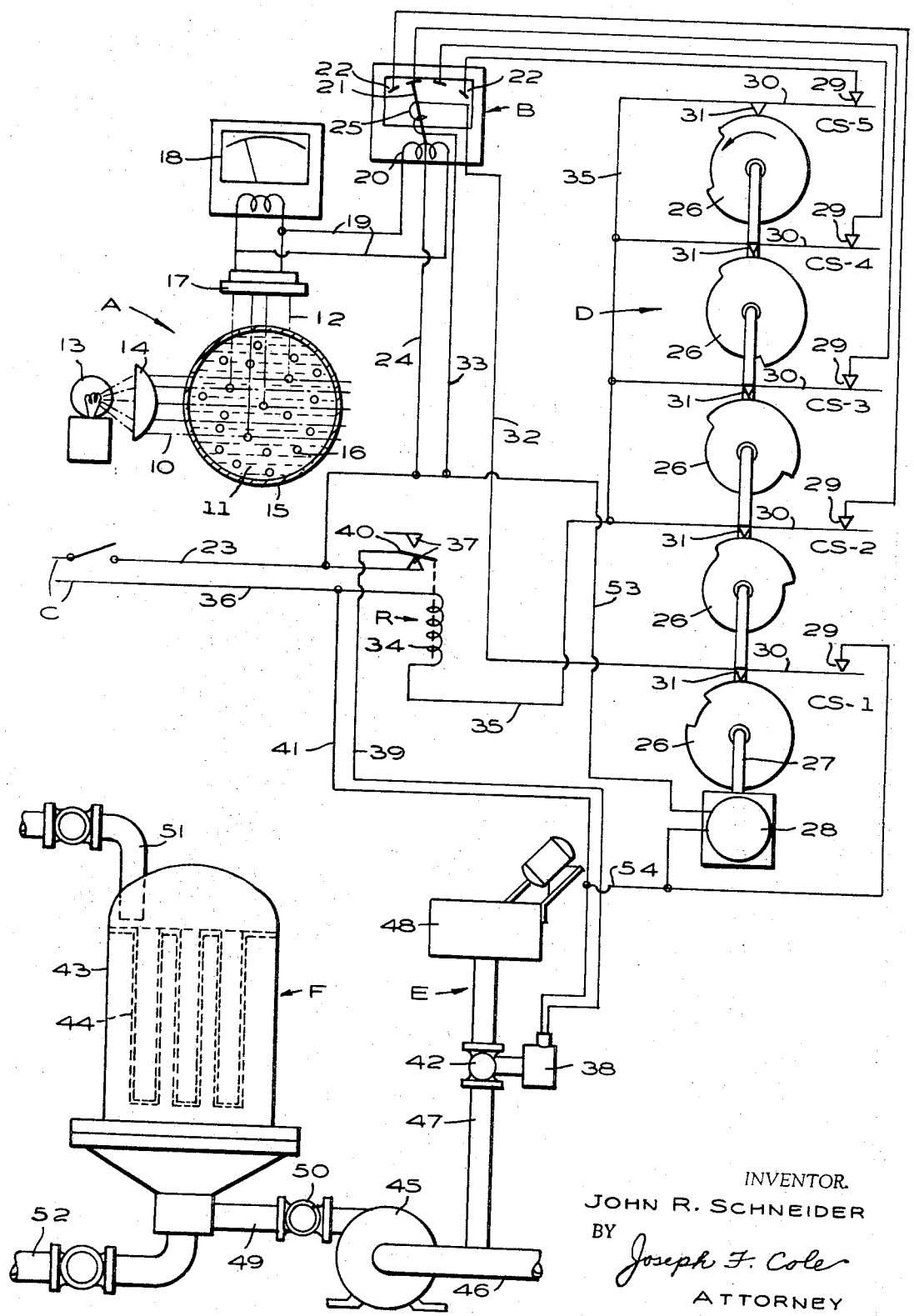
Oct. 31, 1967  J. R. SCHNEIDER  3,349,913
AUTOMATIC DEVICE FOR CONTROLLING FEED OF AIDS TO FILTRATION
Filed Feb. 21, 1966
INVENTOR.
JOHN R. SCHNEIDER
BY Joseph F. Cole
ATTORNEY United States Patent Office 3,349,913
Patented Oct. 31, 1967

ABSTRACT OF THE DISCLOSURE

An automatic device for controlling feed of aids to filtration (referred to in the art as "body feed," or chemicals used to form a flock) to a filter, the device having a turbidimeter wherein light is reflected by turbidity of a liquid sample, with the light falling on a photocell, a readout meter on which the photocell output is indicated, a supply feed for said aids connected to a filter, and means operated by an electrical signal from the readout meter for automatically delivering said aids to the filter in direct proportion to the turbidity of the liquid being filtered.

---

The invention is particularly advantageous when applied to filtering apparatus using diatomaceous earth as the filtering material, and filtering water from a river for domestic or industrial use. The invention is also advantageous when applied to sand filters, or other filters that do not use diatomaceous earth or other such materials as a filter aid, but instead use chemicals to form a flock so filtration can be achieved.

A filter plant taking water from a river is subject to changes in the quality of the incoming water with respect to turbidity. This can be due to rain, disturbance to the water due to rain, disturbance to the water due to river traffic, dust from wind squalls, etc. In such a filter plant economical filtration is dependent on the proper balance of the body feed rate or chemical feed rate to the turbidity of the incoming river water.

When the turbidity of the river goes up the body feed rate must also go up, or the filter medium will seal over, causing the filter inlet pressure to rise rapidly. When the filter inlet pressure reaches a predetermined figure, the filter must be taken off stream and cleaned. This is expensive as it requires labor. On the other hand, if the river has been running dirty and the body feed rate to the filter has been manually set high to maintain an economical balance, if and when the river clears up with respect to turbidity, the body feed must also be reduced, or filter aid is wasted.

The present practice in an unattended filter plant is to manually set the body feed rate high if there is an indication of rain. This is costly and it wastes diatomaceous earth, a limited natural resource in this country.

With my invention these wastes can be eliminated. In most filters body feed is a function of time. The longer the body feed solenoid valve is open per minute cycle, the greater the body feed rate. My invention controls the length of "on" time per cycle the body feed valve is open.

Other objects and advantages will appear as the specification proceeds, and the novel features of the invention will be particularly pointed out in the appended claims.

For a better understanding of the invention, reference should be made to the accompanying drawing, forming part of this specification, in which the view is a schematic view of my automatic device for controlling feed of aids to filtration.

It will be noted that I have shown a turbidimeter designated generally at A that is a continuous flow nephelometer in which a light beam 10 illuminates the surface of the liquid sample 11, and light 12 is reflected by turbidity at or near the water surface, is measured. The beam of light from lamp 13 and lens 14 is passed through a glass tube 15 that contains the liquid sample, and the particles of turbidity 16 that are present reflect or scatter some of the light, as at 12, at right angles to the light beam 10.

If the liquid sample is perfectly clear, no light will be scattered at all. Some of the scattered light falls on a photocell 17, and the photocell output is then indicated on a readout meter 18. The meter reading is proportional to the amount of turbidity present in the liquid.

This type of nephelometer has as its main advantages that it permits the use of a very strong light beam, which gives great sensitivity so that very small amounts of turbidity can be accurately measured. Another feature is that the indicating meter reads zero when zero turbidity is present, and reads upscale with increasing turbidity. A third important feature is that dissolved colors that might be present in the liquid do not register as turbidity.

With further reference to the drawing, it will be seen that a multi-contact meter-relay B has been illustrated which is connected by wires 19 to the turbidimeter A. These wires are connected to a coil 20 of the meter-relay B that actuates or swings a meter-relay arm 21. This meter-relay is a combination meter, sensitive to voltage or current and a switching device with any number of contacts 22.

It will be noted that a source of current C has a wire 23 which is connected by a branch wire 24 to the meter-relay arm 21. The meter-relay B takes a signal from the turbidimeter A, which in turn swings the arm 21 to a position corresponding to the turbidity being read by the turbidimeter. Although the signal from the turbidimeter is continuous to the meter-relay arm 21, the latter cannot move unless the current is "off" of a read-out coil 25 which in turn holds the arm 21 down tight against the meter contacts 22. When this read-out coil is energized, the arm 21 is held down tight closing the electrical circuit from the wire 24 to a contact 22 corresponding to the position of the meter-relay arm.

As a further part of the device there is provided a motor-driven cam switch designated generally at D, with any number of cams 26 being secured to a shaft 27. Motor 28 drives this cam arrangement at a set speed, such as one revolution every 30 seconds, or some other set time, as desired.

The cam switch D has a plurality of switches designated generally at CS–1, CS–2, CS–3, CS–4 and CS–5. Each of these switches is provided by a stationary contact 29 and a movable contact finger 30, the latter being actuated by a follower 31 that rides on the periphery of one of the cams.

Cam switch CS–1 closes first, energizing the read-out coil 25 through wires 32 and 33, and clamping the meter-relay arm 21 down against the meter-relay contact 22 under this arm. As the cam arrangement turns further, the other cam switches close. This energizes relay R which has one end of its coil 34 connected by wire 35 to the cam switches CS–2, CS–3, CS–4 and CS–5, the other end of the coil 34 being connected to a wire 36 leading to the source of current C. This closes contacts 37 of the relay R.

Moreover, a body feed device E has been provided, and its solenoid 38 is energized, since one wire 39 leads from this solenoid to armature 40 of the relay R and a second wire 41 leads from the solenoid to the wire 36 of the source of current C. This will open body feed valve 42, allowing body feed or filter aid to be injected into a filter F.

As the motor-driven cam arrangement continues to turn, the cam switch CS–2 opens, then the cam switch CS–3 and on down the line until all the cam switches are open except CS–1.

The body feed solenoid valve 42 closes due to its coil being de-energized when the cam switch electrically connected to the meter-relay arm 21 opens. This gives the proper amount of body feed for turbidity reading at the time. A few seconds before the cam switch arrangement completes a revolution, but after all other cam switches are open and no current is flowing through the meter-relay contacts, the cam switch CS–1 opens, allowing the meter-relay arm 21 to lift free of the meter-relay contacts 22.

Because the meter-relay arm 21 is free, it can move to correspond to the signal being received from turbidimeter A. If the turbidity of the incoming liquid has gone up, the meter-relay arm 21 will move to another contact 22 on the meter-relay B. This connects with a different cam switch, one that stays closed longer than the cam switch previously used. The cam switch CS–1 closes first, pulling the meter-relay arm 21 down against the corresponding meter-relay contact 22. When this contact is firmly made, all the other contacts close energizing the body feed solenoid valve 42 and opening it. When the cam switch connected to the contact 22 being used on the meter-relay B opens, the body feed solenoid de-energizes, closing the body feed valve 42.

By the above-described method an amount of body feed is fed to the filter F to match the turbidity of the incoming liquid. When setting the apparatus up to the filter initially, each cam switch can be set to open to a corresponding time to suit the filterability-turbidity relationship of the specific river or liquid to be filtered.

By having the cam switch CS–1 open last and close first for each revolution of the cam switch, no current flow is interrupted or started by the delicate meter-relay contacts 22.

As to the filter F previously mentioned, it may consist of any suitable construction. It has been shown as having a tank 43 in which filter cloth elements 44 are arranged. A pump 45 has been shown as being connected by line 46 to a pipe 47 coupled to the valve 42. Thus the body feed from a receptacle 48 will be delivered by the pump 45 through a pipe 49 when the valve 42 is opened. A valve 50 has been shown as being arranged in the pipe 49. Filtrate line 51 is connected to the top of the tank 43 for outflow of the filtered liquid, while a drain line 52 has been disclosed as being coupled to the bottom of this tank. I do not wish to be limited to this type of filter.

Motor 28 is connected by wires 53 and 54 to wires 24 and 41, respectively, that lead to source of current C as shown.

Filtration (the removal of suspended particles from a liquid) is accomplished by forcing the liquid, under pressure or vacuum, through a cloth or screen. The liquid passes through the openings of the filter cloth and the suspended impurities remain upon the cloth, for instance, the filter cloth elements 44. Actually, in many cases, the finer suspended solids pass with the liquid through comparatively coarse openings in the filter cloth; the larger particles, particularly if soft, remain behind upon the cloth to clog the openings, smear the cloth, and slow down or entirely stop the flow through the filter.

In modern filtration, these difficulties are overcome by adding a small amount of filter powder to the liquid to be filtered. The function of the filter powder, or filter aid or body feed as it is called, is the formation on the cloth 44 of an open, porous cake or screen—a screen of sufficient fineness to trap out all the suspended impurities, yet porous enough to prevent clogging and to allow the liquid to pass through at a high rate of flow.

To accomplish this, the filter powder must be finely divided, highly porous, light in weight and insoluble. Of course, it must not affect the chemical or physical properties of the filtrate. Because diatomaceous earth or silica has been endowed by nature with all these essential properties, it has become the accepted material for clarification of virtually all liquids that require filtration.

However, as previously stated, this invention may also be used with sand filters, or other filters, that use chemicals to form a flock so that filtration can be achieved.

When the turbidity in a river or other water supply increases due to reasons already mentioned, the quantity of the chemicals being fed to the system must also be increased to maintain the proper pH value, or the flock will not form properly. Conversely, if the turbidity in the river or other water supply decreases, the quantity of chemicals fed to the system must also be decreased to again maintain the proper pH value, or again the flock will not form properly and good filtration will not be achieved.

With this invention, the proper balance of chemicals fed to the system can be maintained automatically regardless of the changes in turbidity of the incoming water. Such chemicals would be placed in the equivalent of the receptacle 48 and delivered by the feed valve to the filter being employed.

The generic expression "aids to filtration" is sufficiently broad as to encompass filter aids or body feeds (such as diatomaceous earth) or chemicals used to form a flock.

The liquid to be filtered enters pump 45 through the inlet pipe 46, where the aids to filtration are mixed with the incoming liquid prior to entering the filter.

This device can also control a dry feeder, as chemicals also come in a dry form (soda ash which controls pH is in dry form). This device can control a dry feeder by making the feeder motor go "off" and "on" or a clutch between the motor drive and feeder can be energized to intermittently turn the dry feeder on a time cycle.

I claim:
1. In an automatic device for controlling feed of aids to filtration:
    (a) a turbidimeter that is a continuous flow nephelometer in which a light beam illuminates a liquid sample, and light is reflected by turbidity of the liquid and falls on a photocell;
    (b) the turbidimeter further having a readout meter on which the photocell output is indicated, the meter reading being proportional to the amount of turbidity present in the liquid;
    (c) a supply feed for said aids to filtration connected to a filter, and including a feed valve for controlling injection of the aids to filtration to the filter;
    (d) and operating means connected to the readout meter and the feed valve, and actuated by an electrical signal from the readout meter, to automatically open the feed valve and deliver said aids to filtration to the filter in direct proportion to the amount of turbidity in the liquid being filtered;
    (e) said operating means including:
        (1) a multi-contact meter-relay having a number of contacts, and a meter-relay arm movable over these contacts in succession, the arm being actuated by the electrical signal from the readout meter and movable to a position corresponding to the turbidity being read by the readout meter;
        (2) the meter-relay arm being connected to a source of current, and the meter-relay having a read-out coil for holding the arm down tight closing the electrical circuit from the source of current to a contact of the meter-relay corresponding to the position of the arm.

2. In an automatic device for controlling feed of aids to filtration:
    (a) a turbidimeter that is a continuous flow nephelometer in which a light beam illuminates a liquid sample, and light is reflected by turbidity of the liquid and falls on a photocell;
    (b) the turbidimeter further having a readout meter on which the photocell output is indicated, the meter reading being proportional to the amount of turbidity present in the liquid;
(c) a supply feed for said aids to filtration connected to a filter, and including a feed valve for controlling injection of the aids to filtration to the filter;
(d) and operating means connected to the readout meter and the feed valve, and actuated by an electrical signal from the readout meter, to automatically open the feed valve and deliver said aids to filtration to the filter in direct proportion to the amount of turbidity in the liquid being filtered;
(e) said operating means including:
   (1) a multi-contact meter-relay having a number of contacts, and a meter-relay arm movable over these contacts in succession, the arm being actuated by the electrical signal from the readout meter and movable to a position corresponding to the turbidity being read by the readout meter;
   (2) the meter-relay arm being connected to a source of current, and the meter-relay having a read-out coil for holding the arm down tight closing the electrical circuit from the source of current to a contact of the meter-relay corresponding to the position of the arm;
(f) and said operating means further including:
   (1) a motor-driven cam arrangement having a number of cams driven by a motor at a set speed;
   (2) a cam switch associated with and actuated by each of the cams so that the cam switches will be opened and closed as the cams are turned;
   (3) one of these cam switches being made to close first, and being electrically connected to the rear-out coil to clamp the meter-relay arm down against the meter-relay contact under this arm;
   (4) the other cam switches being electrically connected to the meter-relay contacts and made to close in succession as the cam arrangement turns further so as to energize a relay, the latter being connected to the source of current;
   (5) the body feed valve being solenoid operated and being electrically connected to the relay so as to open this valve when the relay is energized, whereby the aids to filtration will be injected into the filter.

3. The automatic device for controlling feed of aids to filtration, as set forth in claim 2;
   (g) and in which said one of these cam switches is made to close first and is opened after all of the other cam switches are opened and no current is flowing through the meter-relay contacts, whereby the meter-relay arm will lift free of the meter-relay contacts.

4. The automatic device for controlling feed of aids to filtration, as set forth in claim 2;
   (g) and in which each cam switch can be set up to open to a corresponding time to suit the filterability-turbidity relationship of the liquid to be filtered.

References Cited
UNITED STATES PATENTS

| | | | |
|---|---|---|---|
| 2,299,529 | 10/1942 | Crampton | 210—96 |
| 2,358,338 | 9/1944 | Lilja et al. | 210—96 X |
| 3,160,008 | 12/1964 | Gestler | 210—89 X |
| 3,273,576 | 9/1966 | Fluegel et al. | 210—96 X |

FOREIGN PATENTS 717,479   10/1954   Great Britain.

SAMIH N. ZAHARNA, *Primary Examiner.*

REUBEN FRIEDMAN, *Examiner.*

J. ADEE, *Assistant Examiner.*